United States Patent [19]
Mueller

[11] Patent Number: 4,671,886
[45] Date of Patent: Jun. 9, 1987

[54] PROCESS FOR COLORING GRANULAR PRODUCT BY ADMIXING WITH PIGMENT/DILUENT PREMIX

[75] Inventor: Frank J. Mueller, Cincinnati, Ohio

[73] Assignee: The Procter & Gamble Company, Cincinnati, Ohio

[21] Appl. No.: 801,644

[22] Filed: Nov. 25, 1985

[51] Int. Cl.[4] .......... C09C 3/06; C11D 3/14; C11D 17/06

[52] U.S. Cl. .......... 252/140; 8/525; 8/618; 8/637; 106/288 R; 106/288 B; 106/288 Q; 106/289; 106/305; 106/307; 252/89.1; 252/135; 252/174; 252/174.25

[58] Field of Search .......... 252/89.1, 135, 140, 252/174.25, 174; 8/618, 637, 525; 106/288 R, 288 B, 288 Q, 289, 305, 307

[56] References Cited

U.S. PATENT DOCUMENTS

| | | | |
|---|---|---|---|
| 824,294 | 6/1906 | Griswold | 8/637 |
| 1,672,920 | 6/1928 | West | 8/618 |
| 2,059,449 | 11/1936 | Fowler | 8/618 |
| 2,893,818 | 7/1959 | Millsaps | 8/618 |
| 2,979,373 | 4/1961 | Seegrist | 8/637 |
| 3,123,565 | 3/1964 | Millsaps | 252/135 |
| 3,554,473 | 12/1970 | Kitchen et al. | 252/99 |
| 3,630,923 | 12/1971 | Simmons et al. | 252/99 |
| 3,679,610 | 7/1972 | Sams | 252/529 |
| 3,850,833 | 11/1974 | Koceich | 252/99 |
| 3,931,037 | 1/1976 | Hall | 252/135 |
| 4,162,228 | 7/1979 | Robles | 252/90 |
| 4,427,417 | 1/1984 | Porasik | 23/313 R |

FOREIGN PATENT DOCUMENTS 0138410 4/1985 European Pat. Off. .

*Primary Examiner*—Dennis L. Albrecht
*Attorney, Agent, or Firm*—Robert B. Aylor; Richard C. Witte; Thomas H. O'Flaherty

[57] ABSTRACT

Finely divided particulate pigments which form large visible agglomerates are admixed with a non-agglomerating granular diluent to break up the visible agglomerates of pigment in a premix, the premix being used to color granular products such as spray dried detergent granules.

9 Claims, No Drawings

PROCESS FOR COLORING GRANULAR PRODUCT BY ADMIXING WITH PIGMENT/DILUENT PREMIX

TECHNICAL FIELD AND BACKGROUND ART

The present invention relates to coloring granular detergent compositions with insoluble particulate coloring agents, e.g. pigments. Processes for coloring granular detergent compositions are well known. Processes for coloring granular detergent compositions by admixing them with pigments are disclosed in U.S. Pat. No. 3,544,473—Kitchen et al (Dec. 1, 1970); U.S. Pat. No. 3,630,923—Simmons et al (Dec. 28, 1971); U.S. Pat. No. 3,931,037—Hall (Jan. 6, 1976); U.S. Pat. No. 4,162,228—Robles (July 24, 1979); U.S. Pat. No. 4,427,417—Porasik (Jan. 24, 1984); and European Patent Application No. 0138410—Davies et al, published Apr. 24, 1985, all of said patents and said patent application being incorporated herein by reference.

SUMMARY OF THE INVENTION

This invention relates to solving the undisclosed problem resulting from the tendency of finely divided pigments to agglomerate into visible agglomerates (balls or lumps). When pigments containing these balls or lumps are used to color a granular detergent composition by a simple admixing step, the balls or lumps tend to remain intact even after considerable mixing, which gives a speckled appearance to the product. In addition to having a speckled appearance, these lumps or balls tend to cause staining. If one mixes the pigment with a friable detergent composition, e.g., a friable spray dried composition, for sufficient time and/or with sufficient force to break up the visible pigment agglomerates, the detergent product is broken up, causing dust and a density increase.

It has been discovered that if one mixes a finely divided pigment which forms visible agglomerates with a granular diluent, which does not form agglomerates and mix the pigment and diluent until the visible agglomerates are destroyed to form a premix, the pigment will not reagglomerate and the premix can be used just like the pigment to color granular products, e.g., detergent compositons by a simple admixing step.

DETAILED DESCRIPTION OF THE INVENTION

Finally divided particulate pigments having ultimate particle sizes of from about 0.1 to about 10 microns, preferably from about 1 to about 5 microns and forming large visible agglomerates are admixed with a non-agglomerating granular diluent having a particle size of from about 10 microns to about 600 microns, preferably in a high energy mixer, for a period of time sufficient to break up the agglomerates of the pigment to form a premix, the ratio of the pigment to the diluent being from about 10:1 to about 1:1000. The premix is admixed with another granular product such as a detergent composition to color it, the level of pigment in the detergent composition being from about 0.05% to about 0.5%, preferably from about 0.07% to about 0.2%.

The larger the volume of diluent, the easier it is to mix the pigment with the composition which is to be colored and the less likely it is that the pigment will reagglomerate. However, unless the diluent has some useful function in the product which is to be colored, the level should be minimized.

The Pigment

In the following discussion the pigments will be referred to by the Food and Drug Administration official name with the Color Index (1971) given thereafter in parenthesis. Suitable pigments include the following:

Titanium dioxide (C.I. 77891);
FD&C Blue No. 2 Aluminum Lake (C.I. 73015);
FD&C Red No. 2 Aluminum Lake (C.I. 16185:1);
FD&C Red No. 3 Aluminum Lake (C.I. 45430:1);
FD&C Yellow No. 5 Aluminum Lake (C.I. 19140:1);
FD&C Yellow No. 6 Aluminum Lake (C.I. 15985: 1);
Alumina (C.I. 77002);
Calcium Carbonate (C.I. 77220);
Ultramarine Blue (C.I. 77007);
Ultramarine Green (C.I. 77013);
Ultramarine Red (C.I. 77007);
Ultramarine Violet (C.I. 77007);
Talc (C.I. 77019);
Tin Oxide (C.I. 77861); and
FD&C Blue No. 6 (C.I. 73000).

Ultramarine Blue, and Monastral Red (no FDA name) (C.I. Pigment Violet 19)—(C.I. 46500) are especially preferred pigments.

The above list is merely exemplary. Any finely divided coloring material, e.g., pigment, that tends to agglomerate into visible lumps will be benefited by the use of a premixing step with a non-agglomerating granular diluent.

The Diluent

Suitable non-agglomerating granular diluents include: sodium, potassium, lithium, magnesium, and/or calcium, sulfates. carbonates, fluorides, borates, orthophosphates, pyrophosphates, tripolyphosphates, and mixtures thereof. Sodium sulfate and sodium carbonate are especially preferred. Sodium sulfate is more effective at breaking up lumps than sodium carbonate and colors faster.

The diluent should have a particle size of from about 10 microns, to about 600 microns, preferably from about 10 microns to about 100 microns, be relatively nonhygroscopic, have essentially no tendency to agglomerate, and, preferably, be compatible with detergent compositions.

Ratios of pigment to diluent of from about 10:1 to about 1:1000, preferably from about 1:1 to about 1:100, more preferably from about 1:2 to about 1:50, most preferably from about 1:5 to about 1:20 can be used.

Any granular, non-agglomerating material can be used as a diluent. However, the diluent should be compatible with the end product and preferably will be desirable in the end product. When more diluent is used, more time is required to form the permix, but high energy mixers can be used to shorten the time it takes to break up the visible agglomerates.

Forming the Premix

Suitable high energy mixers include the mixer described in U.S. Pat. No. 4,427,417—Porasik, incorporated herein by reference; Schugi Flex-o-mix 160; and a Littleford FM 130D.

In general, any high energy mixer can be used including high impact mills, high speed ribbon and/or paddle mixers, and blenders with intensifier bars. Normally, the mixer should not break up the granular diluent to any appreciable amount. Other low energy mixers can be used to form the premix, but will require longer mixing times.

Alternatively, the premix can be formed as part of the pigment manufacturing process.

The mixing process normally takes from about one minute to about an hour, with the mixing time being adjusted to permit destruction of the visible agglomerates. Once the premix is formed the premix can be stored and/or added to, e.g., a granular detergent composition.

Coloring a Granular Product With the Premix

The premix can be used to color a granular product, especially a detergent composition. The invention is particularly useful for coloring a friable detergent composition such as a spray dried detergent granule. Admixing the pigment premix to color the granular surface, rather than coloring the entire granule, allows one to use less pigment. Previously, the pigment has been added to the crutcher mix which is spray dried to form a granular detergent composition. This colors the crutcher, the spray drying tower, and the product handling equipment. When a color change is made in the prior process, the tower must be cooled down and all of the equipment cleaned. The present process reduces the amount of equipment that needs cleaning before changing to a differnt color and eliminates the need to cool the tower. The new process reduces the number of cleanings, which creates less waste product. Energy use is less and there is waste disposal required. Use of the premix allows one to use a gentle mixing/blending process that does not break up the detergent granule. The premix is mixed with the product to be colored until the desired uniformity is attained. This is typically for from about 15 seconds to about three minutes, preferably from about 15 seconds, to about 30 seconds. The mixer for preparing the detergent composition can be any of the above high energy mixers, but preferably is a lower energy mixer, such as a continuous rotary drum having baffles, a Munson Rotary Batch 7TS40, J. H. Day Nauta Mod. MB, or a Patterson Kelly Twin Shell Blender or Zig-Zag Continuous mixer.

The detergent compositions which can be colored are any of those disclosed in the previously incorporated patents and patent application, and other detergent compositions. Examples of suitable detergent compositions include those disclosed in U.S. Pat. No. 4,490,271—Spadini et al (Dec. 25, 1984); U.S. Pat No. 4,487,710—Kaminsky (Dec. 11, 1984); and U.S. Pat. No. 4,379,080—Murphy (Apr. 5, 1983), all of said patents being incorporated herein by reference. The premix is added to the detergent granules at a level of from about 0.5% to about 50%, preferably from about 1% to about 2%.

The premix, which is free of visible agglomerates, can be blended, as stated before, without damaging friable detergent granules.

All percentages, ratios and parts herein are by weight unless otherwise stated.

EXAMPLE

In Sample A—0.14 parts of Ultramarine Blue having an ultimate particle size of about 5 microns is added to 89 parts of base granules which are a conventional spray dried detergent granule containing about 20% surfactant and about 65% inorganic salts. In Sample B—0.14 parts of said Ultramarine Blue is premixed with one part of sodium sulfate having a particle size of about 100 microns in a beaker to break up visible agglomerates. Sample B is then added to the same spray dried detergent granules. The granules plus pigment, either along (A), or as a premix (B), premix are mixed in a drum type mixer. The detergent granules, containing (A) the Ultramarine Blue itself; and (B) the premix of Ultramarine Blue with sodium sulfate, are sampled from the mixer after 15, 30, 60, 90, 120 and 180 seconds of mixing and Hunter Color readings taken and speck grades determined as follows:

| | 15 Sec. | 30 Sec. | 60 Sec. | 90 Sec. | 120 Sec. | 180 Sec. |
|---|---|---|---|---|---|---|
| Sample "A" (No $Na_2SO_4$ Premix) | | | | | | |
| L | 92.0 | 88.4 | 84.1 | 83.1 | 81.8 | 79.5 |
| A | +0.8 | +1.2 | +1.9 | +2.0 | +2.3 | +2.8 |
| B | −6.7 | −11.4 | −17.2 | −18.3 | −20.0 | −23.5 |
| ΔE | 20.8 | 15.1 | 8.6 | 7.3 | 5.8 | 3.5 |
| Visual Speck Grade | Many, Large, Obvious | Large, Obvious | Large, Obvious | Large, Obvious | Large, Obvious | Medium size, Obvious |
| Sample "B" (With $Na_2SO_4$ Premix) | | | | | | |
| L | 85.8 | 79.3 | 77.9 | 77.5 | 77.0 | 77.3 |
| A | +1.7 | +3.2 | +3.5 | +3.5 | +3.5 | +3.3 |
| B | −14.4 | −23.5 | −25.4 | −26.2 | −26.8 | −26.5 |
| ΔE | 11.3 | 3.3 | 1.9 | 1.5 | 1.0 | 1.3 |
| Visual Speck Grade | Rare, Small | Very Rare, Small | None None | None None | None None | None None |

As can be seen from the above, the premixed Ultramarine Blue achieves essentially the same coloration of the detergent composition in 30 seconds as is achieved with the Ultramarine Blue by itself in 180 seconds and the number of visible, potentially staining lumps of Ultramarine Blue are eliminated in the premix (Sample B) but are still obvious after three minutes in Sample A.

What is claimed is:

1. The process of coloring a granular detergent product comprising the steps of mixing a finely divided pigment selected from the group consisting of: C.I. 77891; C.I. 73015; C.I. 16185:1; C.I. 45430:1; C.I. 19140:1; C.I. 15985:1; C.I. 77002; C.I. 77005(Blue); C.I. 77013; C.I. 77007(Red); C.I. 77007(Violet); C.I. 77019; C.I. 77861; C.I. 73000; C.I. 46500; and mixtures thereof, which forms visible agglomerates with a granular diluent which does not form an agglomerate in the ratio of pigment to granular diluent of from about 10:1 to about 1:1000 until the visible agglomerates are destroyed to form a premix, said premix being simply admixed with said product to color the product without visible agglomerates.

2. The process of claim 1 wherein the pigment is selected from the group consisting of: C.I. 77007(Blue); C.I. 46500 and mixtures thereof.

3. The process of claim 1 in which the granular diluent is selected from the group consisting of: sodium, potassium, lithium, magnesium, and calcium, sulfates, carbonates, fluorides, borates, orthophosphates, pyrophosphates, tripolyphosphates and mixtures thereof.

4. The process of claim 3 wherein the pigment has an ultimate particle size of from about 0.1 to about 10 microns, said granular diluent has a particle size of from about 10 microns to about 600 microns and the level of pigment in the colored product is from about 0.05% to about 0.5%.

5. The process of claim 4 wherein the ratio of the pigment to the granular diluent is from about 1:1 to about 1:100 and wherein the level of pigment in the colored product is from about 0.07% to about 0.2%.

6. The process of claim 5 wherein the ratio of the pigment to the granular diluent is from about 1:2 to about 1:50.

7. A spray dried granular detergent composition having a surface coating of an admixture prepared by mixing a finely divided pigment selected from the group consisting of: C.I. 77891; C.I. 73015; C.I. 16185:1; C.I. 45430:1; C.I. 19140:1; C.I. 15985:1; C.I. 77002; C.I. 77005(Blue); C.I. 77013; C.I. 77007(Red); C.I. 77007(Violet); C.I. 77019; C.I. 77861; C.I. 73000; C.I. 46500; and mixtures thereof, which forms visible agglomerates with a granular diluent that does not form an agglomerate so that there are no visible agglomerates present, wherein the ratio of pigment to granular diluent is from about 10:1 to about 1:1000, to give a level of pigment in the detergent composition of from about 0.05% to about 0.5%.

8. The detergent composition of claim 7 wherein said spray dried detergent composition is friable.

9. The detergent composition of claim 8 wherein the level of pigment in the detergent composition is from about 0.07% to about 0.2%.

* * * * *